United States Patent
Takemoto et al.

(10) Patent No.: US 9,041,881 B2
(45) Date of Patent: May 26, 2015

(54) LIQUID CRYSTAL DISPLAY DEVICE

(75) Inventors: Hiroyuki Takemoto, Ibaraki (JP); Shunsuke Shuto, Ibaraki (JP); Takehito Fuchida, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 13/259,407

(22) PCT Filed: Mar. 26, 2010

(86) PCT No.: PCT/JP2010/055391
§ 371 (c)(1),
(2), (4) Date: Sep. 23, 2011

(87) PCT Pub. No.: WO2010/110432
PCT Pub. Date: Sep. 30, 2010

(65) Prior Publication Data
US 2012/0008070 A1   Jan. 12, 2012

(30) Foreign Application Priority Data
Mar. 27, 2009   (JP) .................................. 2009-079968

(51) Int. Cl.
*G02B 3/00* (2006.01)
*G02F 1/1335* (2006.01)
(Continued)

(52) U.S. Cl.
CPC .......... *G02B 3/005* (2013.01); *G02F 1/133504* (2013.01); *G02B 5/003* (2013.01); *G02B 5/3033* (2013.01); *G02F 1/133524* (2013.01)

(58) Field of Classification Search
CPC ..................... G02F 1/133524; G02F 1/133504; G02B 5/003; G02B 5/3033; G02B 3/005

USPC ............................................ 349/69, 110, 112
See application file for complete search history.

(56) References Cited

U.S. PATENT DOCUMENTS 5,654,810 A   8/1997 Okamura et al.
6,642,981 B1   11/2003 Chida et al.
(Continued)

FOREIGN PATENT DOCUMENTS

JP   63-095489 A   4/1988
JP   6-160831 A   6/1994
(Continued)

OTHER PUBLICATIONS

International Search Report of PCT/JP2010/055391, mailing date Jun. 15, 2010, previously submitted.
(Continued)

*Primary Examiner* — Richard Kim
*Assistant Examiner* — Kendrick Hsu
(74) *Attorney, Agent, or Firm* — Westerman, Hattori, Daniels & Adrian, LLP

(57) ABSTRACT

A liquid crystal display being capable of improving the contrast ratio in the front direction thereof is provided. A liquid crystal display 100 of the present invention includes, in sequence: a light source device 14 that emits a parallel light beam; a back surface-side polarizer 16; a liquid crystal cell 13; a display surface-side polarizer 11; and a light diffusion layer 15. The liquid crystal display 100 further includes: a selective light-shielding layer 12 between the display surface-side polarizer 11 and the light diffusion layer 15 so that the selective light-shielding layer 12 shields light that is generated by being depolarized and scattered in the liquid crystal cell 13 and travels in a direction that is different from a direction in which the parallel light beam travels.

7 Claims, 7 Drawing Sheets

(51) Int. Cl.
*G02B 5/00* (2006.01)
*G02B 5/30* (2006.01)

(56) References Cited

U.S. PATENT DOCUMENTS

| | | | |
|---|---|---|---|
| 6,822,707 B2* | 11/2004 | Ariyoshi et al. | 349/112 |
| 2002/0093612 A1 | 7/2002 | Maruyama et al. | |
| 2008/0007677 A1* | 1/2008 | Enomoto | 349/106 |
| 2008/0055523 A1* | 3/2008 | Nishihara et al. | 349/96 |
| 2008/0144179 A1 | 6/2008 | Mimura et al. | |
| 2008/0259265 A1* | 10/2008 | Ono et al. | 349/147 |
| 2009/0257000 A1* | 10/2009 | Ogasawara et al. | 349/64 |
| 2010/0231830 A1* | 9/2010 | Hirakata et al. | 349/85 |

FOREIGN PATENT DOCUMENTS

| | | |
|---|---|---|
| JP | 9-230317 A | 9/1997 |
| JP | 10-010513 A | 1/1998 |
| JP | 2000-131693 A | 5/2000 |
| JP | 2004-38009 A | 2/2004 |
| JP | 2006-91701 A | 4/2006 |
| JP | 2007-72239 A | 3/2007 |
| JP | 2008-107404 A | 5/2008 |
| JP | 7-104276 A | 9/2011 |
| TW | 200745633 A | 12/2007 |
| WO | WO 2006046174 A2 * | 5/2006 ............. B60K 35/00 |
| WO | 2007/100143 A1 | 9/2007 |
| WO | 20081023484 A1 | 2/2008 |

OTHER PUBLICATIONS

Japanese Office Action dated Sep. 5, 2013, issued in corresponding Japanese Patent Application No. 2010-072100, w/ English translation.

Taiwanese Office Action dated Dec. 10, 2014, issued in corresponding Taiwanese Patent Application No..099109125, w/partial English translation (8 pages).

* cited by examiner

LIQUID CRYSTAL DISPLAY DEVICE

TECHNICAL FIELD

The present invention relates to a liquid crystal display.

BACKGROUND ART

A liquid crystal display (LCD) is an element displaying letters and images utilizing electrooptic properties of liquid crystal molecules and is widely used in mobile phones, notebook PCs, liquid crystal display TVs, and the like. In recent years, LCDs have come to achieve higher and higher resolution and cover a broad range of applications. Accompanying these, an improvement in display quality such as improving a contrast ratio, widening a viewing angle, or the like is demanded. The contrast ratio "YW/YB" is calculated based on a Y value (white luminance: YW) in a white image and a Y value (black luminance: YB) in a black image, for example. That is, the improving a contrast ratio is achieved by at least one of an increase in white luminance and a reduction in black luminance.

In order to satisfy the above-mentioned demand of the improvement in display quality, for example, a liquid crystal display including: a liquid crystal panel that includes a liquid crystal cell, a polarizing section, an anisotropic optical element, and a light diffusion section; and a light source device including a surface light source and a light-gathering layer (for example, a louver) has been proposed (for example, see Patent Document 1 (paragraph [0032], FIG. 11), Patent Document 2). In this liquid crystal display, the light-gathering layer (for example, a louver) has a function of bringing diffused light from the surface light source close to parallel light. Moreover, for example, a liquid crystal display including a vertical alignment mode liquid crystal cell, i.e., VA (Vertical Aligned) mode liquid crystal cell as a liquid crystal cell, a plurality of retardation films, and a polarizing plate, in which the plurality of retardation films are arranged between the liquid crystal cell and the polarizing plate, has been proposed (see Patent Document 3). It is considered that when the liquid crystal display including the VA mode liquid crystal cell is viewed from the front direction, an almost perfect black display can be provided, and thus, the contrast ratio is high.

PRIOR ART DOCUMENTS

Patent Documents

Patent Document 1: JP H10(1998)-10513 A
Patent Document 2: JP H7(1995)-104276 A
Patent Document 3: JP 2000-131693 A

SUMMARY OF INVENTION

Problem to be Solved by the Invention

However, even in the liquid crystal displays described in Patent Documents 1 to 3, suppression in black luminance in the front direction is not enough, and there is still room for improvement in contrast ratio in the front direction.

Hence, the present invention is intended to provide a liquid crystal display being capable of improving the contrast ratio in the front direction.

Means for Solving Problem

In order to achieve the aforementioned object, the liquid crystal display of the present invention is a liquid crystal display including, in sequence: a light source device that emits a parallel light beam; a back surface-side polarizer; a liquid crystal cell; a display surface-side polarizer; and a light diffusion layer, wherein the liquid crystal display further includes a selective light-shielding layer between the display surface-side polarizer and the light diffusion layer so that the selective light-shielding layer shields light that is generated by being depolarized and scattered in the liquid crystal cell and travels in a direction that is different from a direction in which the parallel light beam travels.

Effects of the Invention

As mentioned above, the liquid crystal display of the present invention includes a selective light-shielding layer arranged between a display surface-side polarizer and a light diffusion layer. Thus, the selective light-shielding layer shields light that is generated by being depolarized and scattered in a liquid crystal cell and travels in a direction that is different from a direction in which the parallel light beam travels. Therefore, the liquid crystal display of the present invention can keep black luminance in the front direction low as compared with a conventional liquid crystal display whereby it is possible for the liquid crystal display of the present invention to improve the contrast ratio in the front direction.

DETAILED DESCRIPTION OF THE INVENTION

Figure 1:
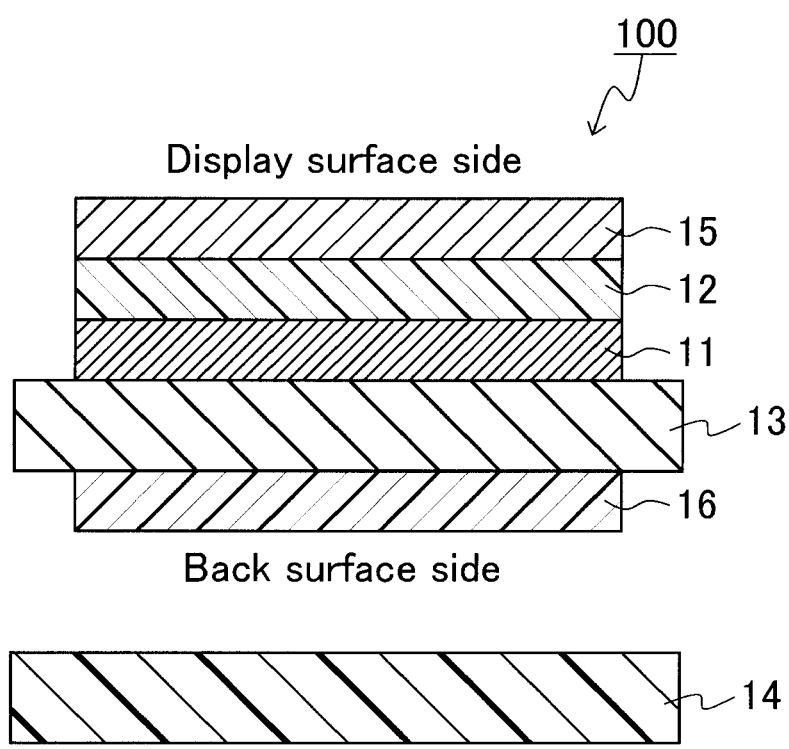
FIG. 1 is a schematic cross-sectional view showing an example of a configuration of the liquid crystal display of the present invention.

The inventors of the present invention conducted earnest studies to further increase the contrast ratio in the front direction of a liquid crystal display (it is called a light collection/diffusion system) including, in sequence: a light source device the emits a parallel light beam, a back surface-side polarizer, a liquid crystal cell, a display surface-side polarizer, and a light diffusion layer. In the course of the studies, the inventors of the present invention found the following. When a parallel light beam that has been polarized by passing through the back surface-side polarizer passes through the liquid crystal cell, a part of the parallel light beam is depolarized and scattered. Thus, light (depolarized scattered light) traveling in a direction that is different from a direction in which the parallel light travels is generated. Then, the depolarized scattered light passes through the display surface-side polarizer and is converted to light traveling in the front direction in the light diffusion layer. Therefore, black luminance in the front direction is increased, so that the contrast ratio in the front direction is reduced. Based on this finding, the inventors of the present invention found that, an increase in black luminance in the front direction of the liquid crystal display can be suppressed by arranging a selective light-shielding layer that shields depolarized scattered light, between the display surface-side polarizer and the light diffusion layer, so that the contrast ratio in the front direction can be improved. Then, they arrived at the present invention.

It is presumed that the parallel light beam is depolarized and scattered by components of the liquid crystal cell such as a color filter, a thin film transistor, gate wiring, source wiring, liquid crystal molecules, and an ITO (Indium Tin Oxide) electrode. The present invention, however, is not limited or restricted by this presumption.

In the liquid crystal display of the present invention, it is preferred that a light-shielding angle of the selective light-shielding layer is in the range from 0.7 to 3.0 times a half-value angle of the parallel light beam emitted from the light source device.

In the liquid crystal display of the present invention, it is preferred that the light-shielding angle of the selective light-shielding layer is in the range from 1° to 100°.

In the liquid crystal display of the present invention, it is preferred that a diffusion half-value angle of the light diffusion layer is in the range from 10° to 100°.

In the liquid crystal display of the present invention, it is preferred that a surface roughness Ra of the light diffusion layer is 0.1 µm or less.

In the liquid crystal display of the present invention, it is preferred that an absorption axis of the back surface-side polarizer is orthogonal to that of the display surface-side polarizer.

In the liquid crystal display of the present invention, it is preferred that the selective light-shielding layer includes: light-shielding parts; and light-transmitting parts, the light-shielding parts and the light-transmitting parts being arranged in stripes so that a direction orthogonal to a width direction of the stripes becomes parallel to an absorption axis of the display surface-side polarizer.

In the liquid crystal display of the present invention, it is preferred that a thickness (X) of each of the light-shielding parts is greater than a width (Y) of each of the light-transmitting parts. It is more preferred that the thickness (X) of each of the light-shielding parts is 1.5 times or more the width (Y) of each of the light-transmitting parts.

In the liquid crystal display of the present invention, it is preferred that the liquid crystal cell contains liquid crystal molecules aligned in a homeotropic alignment.

Next, the present invention is described in detail. It is noted that the present invention is not limited by the following description.

1. Overall Configuration of Liquid Crystal Display of the Present Invention

An example of a configuration of the liquid crystal display of the present invention is shown in a schematic cross-sectional view of FIG. 1. As shown in FIG. 1, this liquid crystal display 100 includes, as main components, a liquid crystal cell 13, a display surface-side polarizer 11, a back surface-side polarizer 16, a light source device 14 that emits a parallel light beam, and a light diffusion layer 15. The light diffusion layer 15 is arranged on a display surface side (on the upper side in FIG. 1) of the liquid crystal cell 13. The light source device 14 is arranged on a back surface side (on the lower side in FIG. 1) of the liquid crystal cell 13. The display surface-side polarizer 11 is arranged between the light diffusion layer 15 and the liquid crystal cell 13. The back surface-side polarizer 16 is arranged between the liquid crystal cell 13 and the light source device 14. The liquid crystal display 100 of the present invention further includes a selective light-shielding layer 12. The selective light-shielding layer 12 is arranged between the display surface-side polarizer 11 and the light diffusion layer 15.

Any adhesive layers (not shown) or any optical components (preferably exert isotropy) can be arranged among the components.

The respective components used in the liquid crystal display of the present invention are described below.

2. Light Source Device that Emits Parallel Light Beam

The light source device used in the present invention is a light source device that emits a parallel light beam. The light source device that emits a parallel light beam can be, for example, a light source device including a surface light source that emits diffusion light and a component that is arranged on a display surface side of the surface light source and converts the diffusion light to a parallel light beam (hereinafter also referred to as a "first light source device). Further, it can be, for example, a light source device including a surface light source that emits a parallel light beam (hereinafter also referred to as a "second light source device").

Figure 2A:
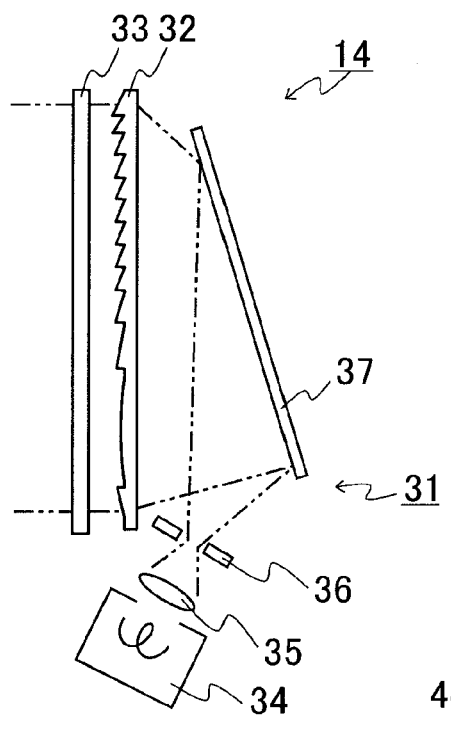
FIGS. 2A to 2F are diagrams illustrating a light source device used in the liquid crystal display of the present invention.
Figure 2B:
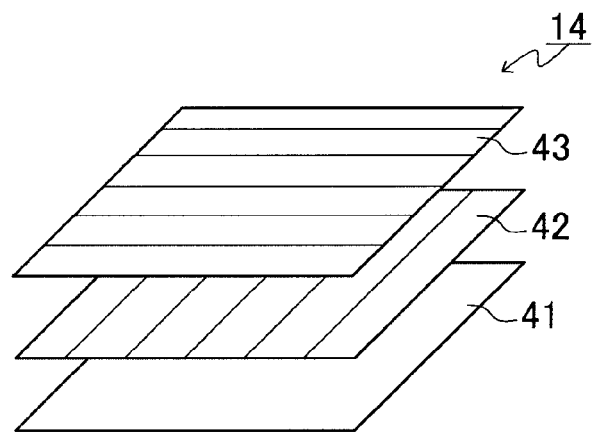
Figure 2C:
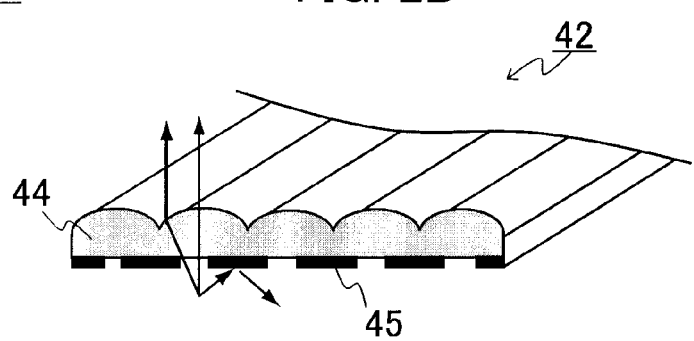
Figure 2D:
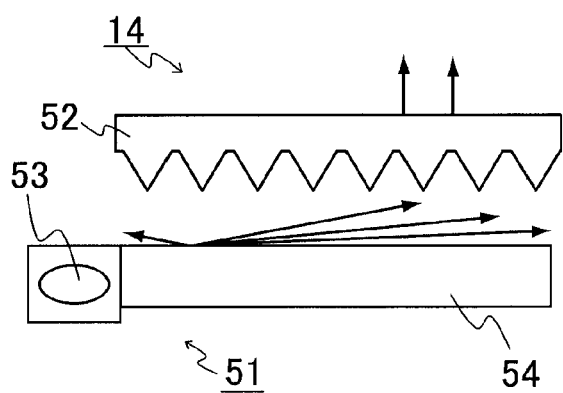
Figure 2F:
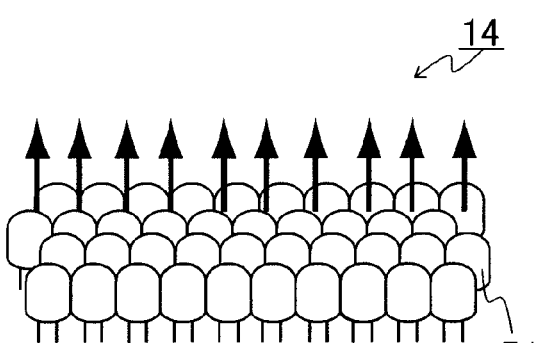
Figure 2E:
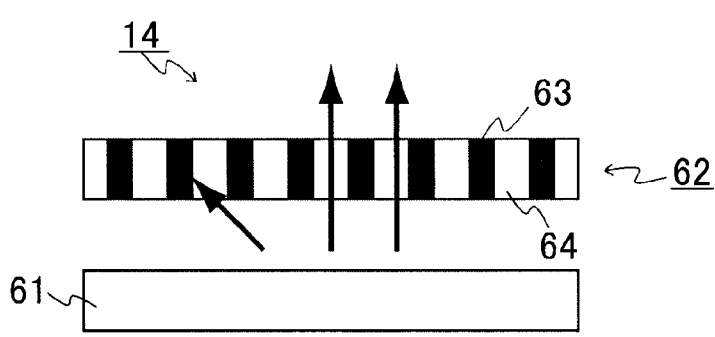

The first light source device can be, for example, as shown in FIG. 2A, a light source device including: a surface light source 31 that includes a light source 34, a projection lens 35, a spot slit 36, and an aluminum mirror surface reflection plate 37; and, as components that convert diffusion light to a parallel light beam, a Fresnel lens 32 arranged on the front side of the surface light source 31 and a diffusion sheet 33 arranged on the front side of the Fresnel lens 32. Further, the first light source device can be, for example, as shown in FIG. 2B, a light source device including: a surface light source 41; and, as components that convert diffusion light to a parallel light beam, a first light-gathering element 42 and a second light-gathering element 43. The first light-gathering element 42 is, as shown in FIG. 2C, a lenticular lens (or a cannonball-type lens) 44, and parts on the smooth surface side of the lenticular lens 44, except for the focuses thereof, are provided with the respective light-shielding layers (or reflection layers) 45. The second light-gathering element 43 has the same configuration as the first light-gathering element 42 and is arranged on the display surface side of the first light-gathering element 42 so as to be orthogonal thereto. Furthermore, the first light source device can be, for example, as shown in FIG. 2D, a light source device including: a surface light source 51 that includes a sidelight-type LED 53 and a light guide plate 54; and, as a component that converts diffusion light to a parallel light beam, an angle-variable prism 52 that has convexities on the surface light source 51 side. Moreover, the first light source device can be, for example, as shown in FIG. 2E, a light source device including: a surface light source 61; and, as a component that converts diffusion light to a parallel light beam, a louver 62. The louver 62 can be, for example, one including a light-absorbing resins 63 that absorb light and light-transmitting resins 64 that transmit light, being alternately laminated in a direction perpendicular to a direction in which light travels. The component that converts diffusion light to a parallel light beam may be attached on the back surface side of the liquid crystal cell. The second light source device can be, for example, as shown in FIG. 2F, a light source device including cannonball-type LEDs 71 aligned.

A direction of a parallel light beam emitted from the light source device can be selected as appropriate according to a direction of light transmitting through a selective light-shielding layer described below and is preferably the front direction. A half-value angle of a parallel light beam emitted from the light source device is preferably 60° or less, more preferably 40° or less, and yet more preferably 20° or less.

3. Back Surface-Side Polarizer and Display Surface-Side Polarizer

The polarizers used in the present invention can convert natural light or polarized light to any polarized light. It is preferred that the polarizers convert natural light or polarized light to linearly-polarized light. When light incident on each of the polarizers is divided into two polarized light components orthogonal to each other, each of the polarizers has functions of allowing one of the polarized light components to pass therethrough and bringing the other polarized light component not to pass therethrough by absorbing, reflecting, scattering, or the like.

As the polarizers, various polarizers such as those each obtained by stretching a polymer film containing a polyvinyl alcohol resin that contains iodine or a dichroic dye, layers having photoactive molecules, and those each obtained by causing dichroic molecules to align on an alignment controller such as a substrate that has been subjected to a rubbing treatment can be used.

Each of the polarizers is, for example, used in a form in which a protective film (front surface protective film and/or back surface protective film) is laminated on one surface or both surfaces of each of the polarizers. At least one surface of the front surface protective film may be provided with a surface-treated layer (for example, an antiglare layer or a hard-coating layer). As the protective film, any suitable polymer film can be used, and for example, commercially available polymer film as it is can be used. When the protective films are laminated on both surfaces of each of the polarizers, the thickness thereof is, for example, in the range from 20 to 300 μm.

It is preferred that the back surface-side polarizer and the display surface-side polarizer are arranged so that the absorption axis of the back surface-side polarizer becomes orthogonal to that of the display surface-side polarizer. The term "orthogonal" encompasses the case of substantially orthogonal, which means, for example, the deviation is within the range from 90°±2°, preferably from 90°±1°. Also, in the present invention, the term "parallel" also encompasses the case of "substantially parallel", which means, for example, the deviation is within the range from 0°±2°, preferably from 0°±1°.

4. Liquid Crystal Cell

Any liquid crystal cell can be employed as the liquid crystal cell of the present invention. Examples of the liquid crystal cell include active-matrix type liquid crystal cell using a thin film transistor and a simple-matrix type liquid crystal cell. A liquid crystal cell generally includes a pair of substrates and a liquid crystal layer as a display medium being sandwiched between the pair.

It is preferred that the liquid crystal cell contains liquid crystal molecules aligned in a homeotropic alignment. According to the classification of drive modes, examples of the drive mode of the liquid crystal cell include a twisted nematic (TN) mode, a vertical alignment (VA) mode, an optical compensation birefringent (OCB) mode, a vertical alignment electrically controlled birefringence (ECB) mode, and a blue phase mode. Among them, the VA mode is particularly preferable.

The VA-mode liquid crystal cell may have a multi-domain structure by forming a slit in an electrode or by using a base having a projection on its surface, as described in JP H11 (1999)-258605A. Examples of such a liquid crystal cell include "ASV (advanced super view) mode" (product name), "CPA (continuous pinwheel alignment) mode" (product name) produced by Sharp Corporation; "MVA (multi-domain vertical alignment) mode" (product name) produced by Fujitsu Ltd.; "PVA (patterned vertical alignment) mode" (product name), "EVA (enhanced vertical alignment) mode" (product name) produced by Samsung Electronics; "SUR-VIVAL" ("super ranged viewing vertical alignment") mode (product name) produced by Sanyo Electric Co., Ltd.; and the like. As the VA mode liquid crystal cell, it is possible to use a liquid crystal cell equipped in a commercially available liquid crystal display as it is, for example. The present invention is particularly effective for a mode in which liquid crystal molecules are aligned in a homeotropic alignment at the time of applying no voltage. Preferred drive mode of the liquid crystal cell can also be, for example, an in-plane switching (IPS) mode.

5. Selective Light-Shielding Layer

The selective light-shielding layer is arranged between the display surface-side polarizer and the light diffusion layer. With the arrangement, light that is generated by being depolarized and scattered in the liquid crystal cell, travels in a direction that is different from a direction in which the parallel light beam travels, and leaked from the display surface-side polarizer among light passed through the liquid crystal cell can be shielded. Therefore, a black luminance in the front direction of the liquid crystal display can be suppressed, and a contrast ratio in the front direction can be improved. As long as at least a part (a part on the back surface-side) of the selective light-shielding layer is arranged between the display surface-side polarizer and the light diffusion layer, the rest (a part on the display surface-side) of the same may be arranged in the light diffusion layer (FIGS. 4C to 4F and the like).

It is preferred that the selective light-shielding layer allows light emitted from a backlight in an oblique direction to be transmitted therethrough and allows depolarized scattered light generated in a liquid crystal cell in an oblique direction to be selectively absorbed therein. Therefore, the light-shielding angle of the selective light-shielding layer is preferably in the range from 0.7 to 3.0 times the half-value angle of the parallel light beam emitted from the light source device, more preferably in the range from 1.0 to 2.0 times the same. When the light-shielding angle is less than 0.7 time the half-value angle of the parallel light beam, the selective light-shielding layer absorbs also light emitted from the light source device, which results in considerable reduction in white luminance. On the other hand, when the light-shielding angle is in excess of 3.0 time the half-value angle of the parallel light beam, the selective light-shielding layer allows light emitted from the light source device to be transmitted therethrough and, however, cannot allow depolarized scattered light generated in the liquid crystal cell to be effectively absorbed therein. Therefore, it is difficult to obtain an effect of improving a contrast ratio in the front direction. Specifically, the light-shielding angle of the selective light-shielding layer is preferably in the range from 1° to 100°, more preferably from 5° to 60°, and yet more preferably from 10° to 40°. The light-shielding angle range of the selective light-shielding layer indicates a range of an angle between two points at which transmittance shows ½ the maximum transmittance. In the present invention, when the selective light-shielding layer has anisotropy, the light-shielding angle of the selective light-shielding layer is a minimum angle of light-shielding angle in every direction.

Figure 3A:
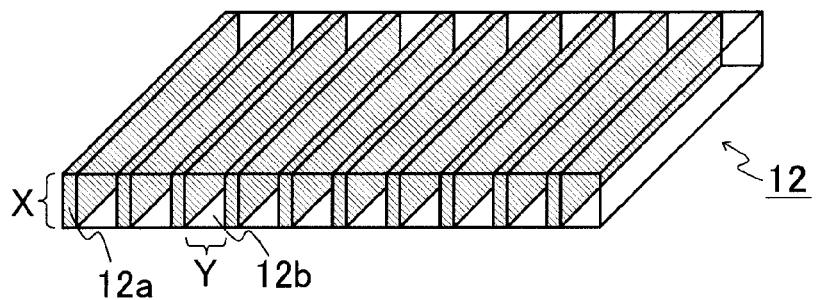
FIGS. 3A to 3E are diagrams illustrating a selective light-shielding layer in the liquid crystal display of the present invention.
Figure 3B:
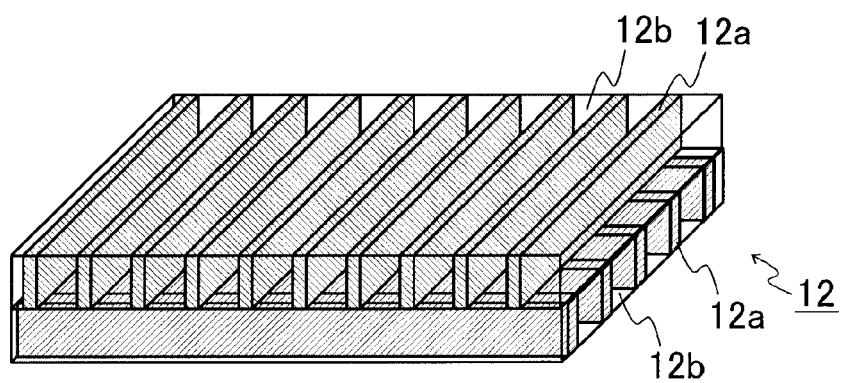
Figure 3C:
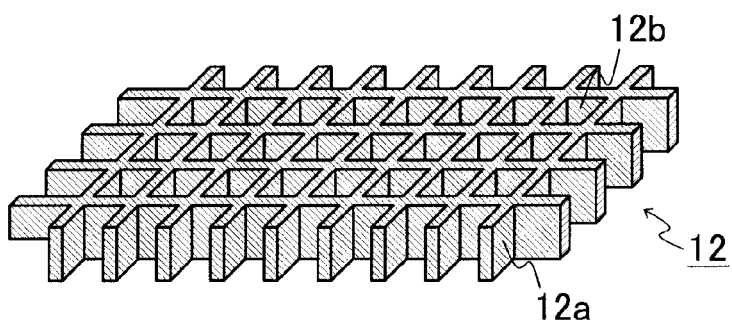
Figure 3D:
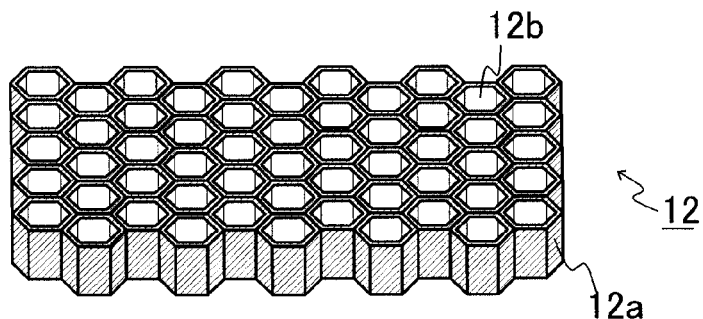
Figure 3E:
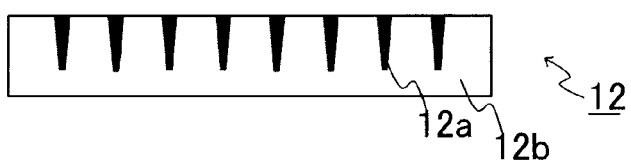

The selective light-shielding layer includes, in the plane thereof, light-shielding parts of shielding (for example, absorbing, reflecting, diffusing, or the like, and preferably absorbing) light and light-transmitting parts of transmitting light, for example. The form of the selective light-shielding layer can be, for example, as shown in FIG. 3A, a form (stripe form) in which light-shielding parts 12a and light-transmitting parts 12b are arranged alternately in one direction in plane of the selective light-shielding layer. Such a form has a simple configuration, and thus, the productivity is superior. In this form, the thickness (X) of each of the light-shielding parts 12a is preferably in the range from 20 to 400 µm, more preferably from 40 to 300 µm. It is preferred that the width (Y) of each of the light-transmitting parts 12b is greater than the width of each of the light-shielding parts 12a from the viewpoint that a total light beam transmittance of the selective light-shielding layer is not caused to be reduced. The width (Y) of each of the light-transmitting parts is preferably in the range from 20 to 200 µm, more preferably from 30 to 150 µm. The width of each of the light-shielding parts 12a is preferably in the range from 0.1 to 20 µm, more preferably from 1 to 15 µm. It is preferred that the thickness (X) of each of the light-shielding parts 12a is greater than the width (Y) of each of the light-transmitting parts 12b. With these ranges, light that is generated by being depolarized and scattered and travels in a direction that is different from a direction in which a parallel light beam travels can be further shielded. The thickness (X) of each of the light-shielding parts 12a is more preferably 1.5 times the width (Y) of each of the light-transmitting parts 12b, and yet more preferably from 1.5 to 3.0 times the same. A form of the selective light-shielding layer can also be, for example, as shown in FIG. 3B, a form in which selective light-shielding layers shown in FIG. 3A are laminated so as to be orthogonal to each other. With such a form, light that is generated by being depolarized and scattered and travels in a direction that is different from a direction in which a parallel light beam travels can be further shielded, and the contrast ratio can be further improved. The form of the selective light-shielding layer can also be, for example, as shown in FIG. 3C, a grid form of light-shielding parts 12a. In this form, light-transmitting parts 12b are in the grid. It is preferred that the light-transmitting parts 12b are formed of a material for forming a light-transmitting part. However, they may be, for example, space. With such a form, light that is generated by being depolarized and scattered and travels in a direction that is different from a direction in which a parallel light beam travels can be further shielded in a single selective light-shielding layer, and it is possible to make the selective light-shielding layer thinner. The form of the selective light-shielding layer can also be, for example, as show in FIG. 3D, a honeycomb form of light-shielding parts 12a. In this form, light-transmitting parts 12b are in the honeycomb. It is preferred that the light-transmitting parts 12b in the honeycomb are formed of a material for forming a light-transmitting part. However, they may be, for example, space. With such a form, light that is generated by being depolarized and scattered in a direction that is different from a direction in which a parallel light beam travels can be further shielded in a single selective light-shielding layer and travels, and it is possible to make the selective light-shielding layer thinner. The form of the selective light-shielding layer can also be, for example, as shown in FIG. 3E, a form in which light-shielding parts 12a each has a trapezoidal shape. As shown in FIGS. 3A to 3E, the light-shielding parts in the selective light-shielding layers of these examples are parallel to the thickness direction (longitudinal direction in FIGS. 3A to 3E) of the selective light-shielding layer. However, the selective light-shielding layer used in the liquid crystal display of the present invention is not limited to this. The light-shielding parts may be inclined at a desired angle with respect to the thickness direction of the selective light-shielding layer. The desired angle is not particularly limited and can be set as appropriate according to an arrangement of a light source device or the like.

A selective light-shielding layer can be produced by a conventionally known method. A selective light-shielding layer can be produced as follows, for example. That is, first, laminate sheets each including a light-shielding part and a light-transmitting part are produced using a material for forming a light-shielding part and a material for forming a light-transmitting part. Then, the laminate sheets are laminated to one another so that the light-shielding part and the light-transmitting part in each of the laminate sheets become alternate to each other. Thus, a laminate is formed. Thereafter, the laminate is welded by heating and pressuring it and then sliced along a direction that is orthogonal to a lamination plane so as to have a predetermined thickness. Thus, a selective light-shielding layer can be produced. Examples of the materials and the method for forming the selective light shielding layer includes those described in JP H6(1994)-50605 B, Japanese Patent Nos. 3043069 and 3130030, JP H8(1996)-11211 B, JP 2007-279424 A, JP 2007-86142 A, and JP 2004-37671 A.

Figure 7:
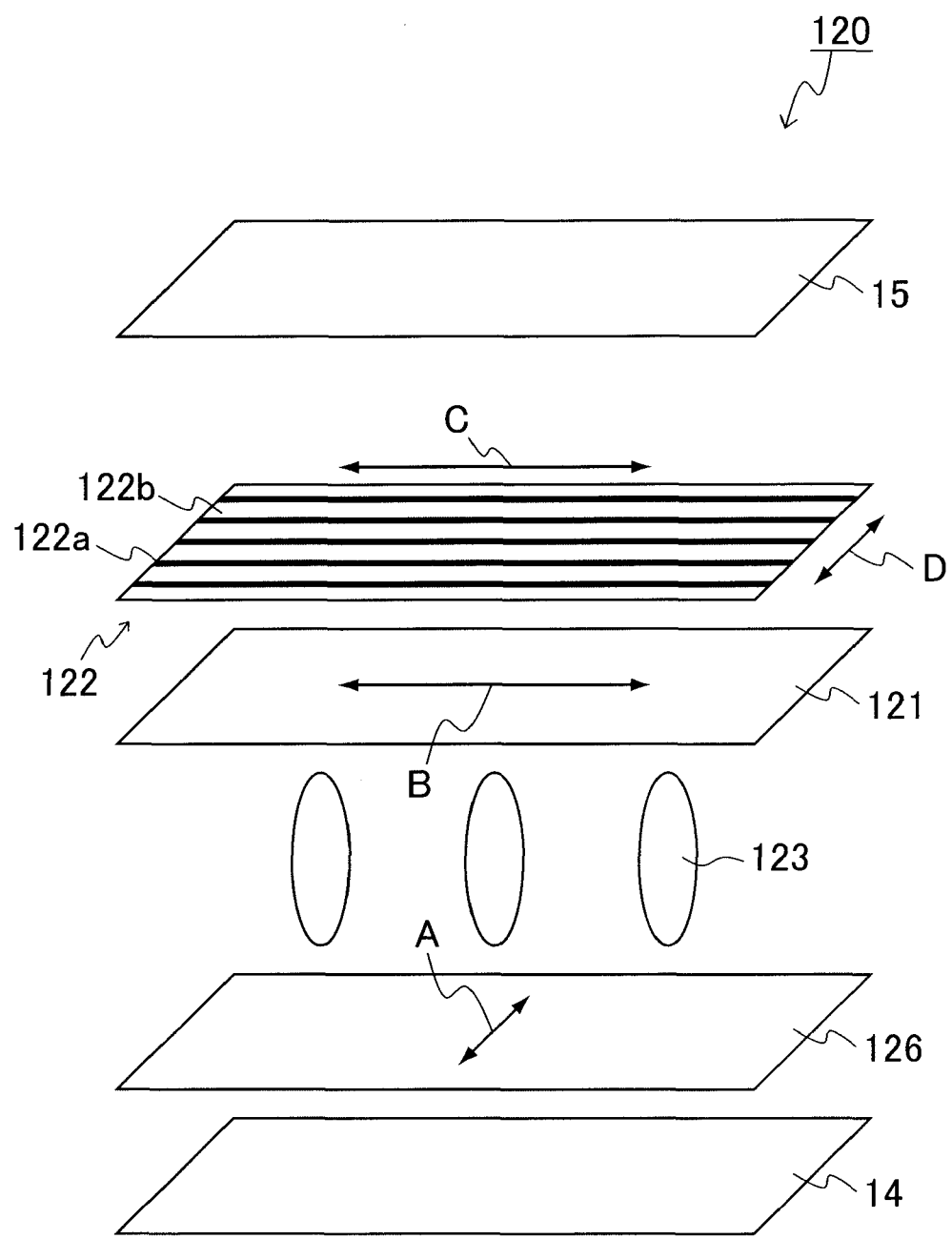
FIG. 7 is a diagram showing relationships between a selective light-shielding layer and a display surface-side polarizer and between the selective light-shielding layer and a back surface-side polarizer.

As shown in FIG. 7, a selective light-shielding layer 122 includes light-shielding parts 122a and light-transmitting parts 122b, being arranged in stripes. In FIG. 7, identical parts to those shown in FIG. 1 are indicated with identical numerals. It is preferred that the selective light-shielding layer 122 is arranged so that a direction (indicated by an arrow C; a left and right direction of FIG. 7) that is orthogonal to a width direction (indicated by an arrow D) of the stripes between the light-shielding parts 122a and the light-transmitting parts 122b becomes parallel to an absorption axis direction (indicated by an arrow B) of a display surface-side polarizer 121 (a direction (indicated by an arrow C) that is orthogonal to a width direction of the stripes between the light-shielding parts 122a and the light-transmitting parts 122b becomes orthogonal to an absorption axis direction (indicated by an arrow A) of a back surface-side polarizer 126). The reasons for this are as follows. That is, in a liquid crystal display 120 including a liquid crystal cell (for example, a VA mode liquid crystal cell) containing liquid crystal molecules 123 aligned in a homeotropic alignment, in which the display surface-side polarizer 121 and the back surface-side polarizer 126 are arranged so that the absorption axis (indicated by the arrow B) of the display surface-side polarizer 121 becomes orthogonal to that (indicated by the arrow A) of the back surface-side polarizer 126, when linearly polarized light (polarized light P) vibrating in the direction parallel to the liquid crystal display 120 is, for example, incident on the liquid crystal cell, the linearly polarized light is depolarized and scattered in the direction orthogonal to the liquid crystal display 120 more intensely than the direction parallel to the same. On the other hand, when linearly polarized light (polarized light S) vibrating in a direction orthogonal to the liquid crystal display 120 is incident on the liquid crystal cell of the liquid crystal display 120, the linearly polarized light is depolarized and scattered in the direction parallel to the liquid crystal display 120 more intensely than the direction orthogonal to the same. Therefore, as mentioned above, in a liquid crystal display including a liquid crystal cell containing liquid crystal molecules aligned in a homeotropic alignment, in which a display surface-side polarizer and a back surface-side polarizer are arranged so that the absorption axis of the display surface-side polarizer becomes orthogonal to that of the back surface-side polarizer, when the selective light-shielding layer is arranged so that a direction (a longitudinal direction of light-shielding parts) that is orthogonal to the width direction of the stripes becomes parallel to the absorption axis of the display surface-side polarizer, the light that is generated by being depolarized and scattered and travels in a direction that is different from a direction in which the parallel light beam emitted from the light source device travels can be shielded more effectively while maintaining light use efficiency.

6. Light Diffusion Layer

As the light diffusion layer used in the present invention, a conventionally known light diffusion layer can be used. The light diffusion layer may be, for example, in a form obtained by applying a material for forming a hard coat in which fine particles such as polymer fine particles, silica fine particles, or silicone fine particles are dispersed, on a base film or in a form of composite component obtained by dispersing the fine particles on the surface of the selective light-shielding layer.

Figure 4A:
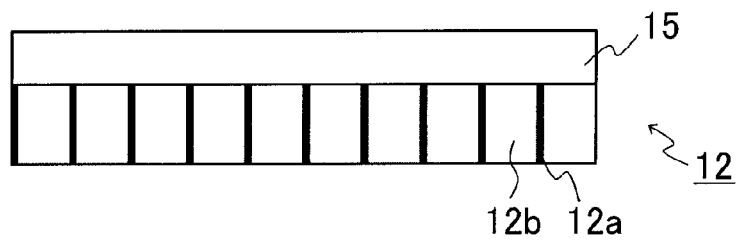
FIGS. 4A to 4F are diagrams explaining a relationship between a selective light-shielding layer and a light diffusion layer in the liquid crystal display of the present invention.
Figure 4B:
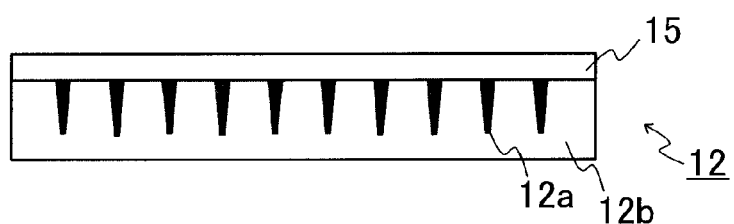
Figure 4C:
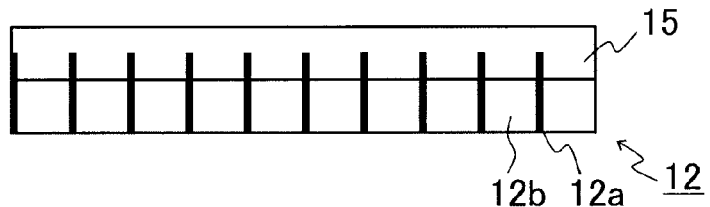
Figure 4D:
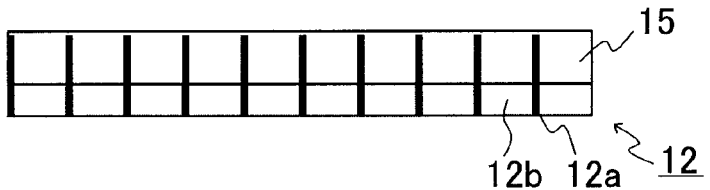
Figure 4E:
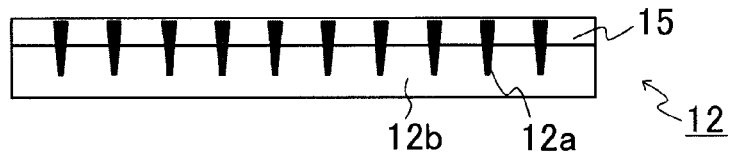
Figure 4F:
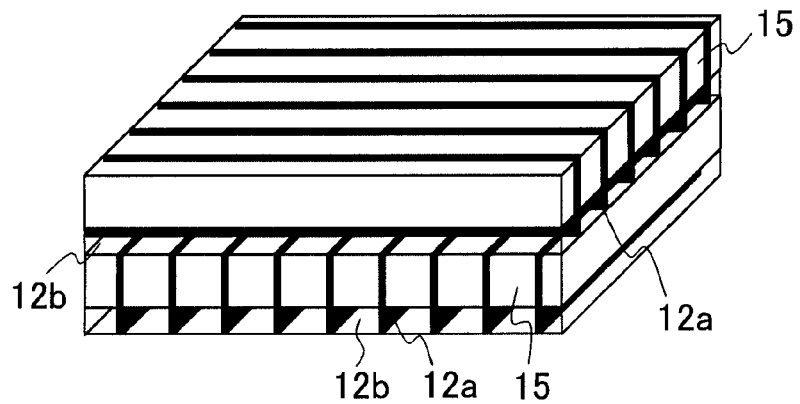

In the case where the selective light-shielding layer is, for example, as shown in FIG. 1, arranged between the display surface-side polarizer and the light diffusion layer, and the light diffusion layer is in a form of a single component, a light diffusion layer 15 is, for example, as shown in FIGS. 4A and 4B, arranged on the surface (the upper surface in each of FIGS. 4A and 4B) of the selective light-shielding layer 12. In the case where the light diffusion layer is in a form of the composite component, a light diffusion layer 15 may be, for example, as shown in FIGS. 4A and 4B, in a form in which the fine particles are dispersed on the surface of the selective light-shielding layer 12. In the case where at least a part of the light diffusion layer is arranged on a display surface side of the selective light-shielding layer, a light diffusion layer 15 may be, as shown in FIG. 4C, in a form in which a part of the light diffusion layer 15 is buried in the selective light-shielding layer 12 or is, as shown in FIGS. 4D and 4E, in a form in which almost a whole light diffusion layer 15 may be buried in the selective light-shielding layer 12. With such a form shown in FIGS. 4C to 4E, the light diffusion layer and the selective light-shielding layer can be integrated. Thus, it is possible to make the liquid crystal display thinner. A component obtained by laminating the light diffusion layer and the selective light-shielding layer may be used alone or, for example, as shown in FIG. 4F, a laminate obtained by laminating two or more of the components so as to be orthogonal to one another may be used.

As a diffusion property of the light diffusion layer, a diffusion half-value angle is preferably in the range from 10° to 100°. The diffusion half-value angle of the light diffusion layer can be, for example, a sum of two angles in a left and right direction or up and down direction of a liquid crystal display, at each of which a front diffusion luminance except for a light diffusion luminance of a linearly transmitting component is half at the time when a parallel light beam such as laser light or the like is normally incident on the light diffusion layer. The diffusion half-value angle of less than 10° may bring about the possibility of failure to maintain uniform brightness in an oblique direction. On the other hand, the diffusion half-value angle in excess of 100° causes total reflection at an interface between the light diffusion layer and air, and thus wide-angle light-diffusing component that cannot be emitted from the surface of the light diffusion layer is generated. This wide-angle light-diffusing component may bring about the possibility of reducing an image quality by being reflected and diffused into other pixels and panel. The diffusion half-value angle is more preferably in the range from 20° to 80°, yet more preferably from 30° to 75°.

As a diffusion property of the light diffusion layer, a haze value is preferably in the range from 90% to 99%. The haze value is more preferably from 92% to 99%, yet more preferably from 95% to 99%.

It is more preferred that the surface of the light diffusion layer is flat. By using such a light diffusion layer, backlight light emitted from the inside of a panel can be prevented from returning to the inside of the panel of the light diffusion layer or at the interface between the light diffusion layer and air. Therefore, it is difficult to generate stray light in the inside of the panel. Therefore, the contrast ratio in the front direction can be prevented from being decreased due to the stray light.

The light diffusion layer is preferably an internal diffusion-mode light diffusion layer having flat surface. The surface roughness Ra of such a light diffusion layer is preferably 0.1 μm or less, more preferably 0.07 μm or less, and yet more preferably 0.04 μm or less. When the liquid crystal display includes such a light diffusion layer having flat surface, returning of diffusion light due to the total reflection at the interface between the light diffusion layer and air, occurred in a light diffusion layer utilizing concavity and convexity of the surface thereof, is not generated. Therefore, the contrast ratio in the front direction is not reduced, and thereby preferable. The surface roughness Ra is an arithmetic average surface roughness (μm) defined by JIS B 0601 (1994 version).

The surface of the light diffusion layer can be provided with an antireflection layer as required. By the antireflection layer, light emitted from the light diffusion layer at the interface between the light diffusion layer and air can be prevented from being reflected. Thus, the returning of diffusion light does not occur, and thereby preferable. Examples of the antireflection layer include: a layer formed of a fluorine resin, a fluorine-containing resin, or a resin containing hollow nanoparticles such as hollow nanosilica particles; and an antireflection layer having a nanostructure such as a moth-eye structure. The thickness of each of these layers is preferably in the range from 0.05 to 1 μm. The resins can be set by a setting method such as a sol-gel method, a thermal setting by isosyanate, and an ionization radiation setting by an unsaturated polymerizable cross-linking group such as acryl and a photo initiator. The refractive index of the antireflection layer is preferably in the range from 1.2 to 1.5. The reflectance on the surface of the light diffusion layer, obtained through providing it with the antireflection layer is preferably in the range from 0.1% to 3.5%.

7. Other Component

As the other component of the liquid crystal display of the present invention, a retardation plate may be included, for example. The retardation plate is not particularly limited, and a conventionally known retardation plate can be used.

EXAMPLE

The example of the present invention is described together with the comparative examples. The present invention is neither limited nor restricted by the following example and comparative examples. Various properties and physical properties in the respective example and comparative examples were measured and evaluated by the following methods.

(Contrast Ratio in Front Direction of Liquid Crystal Display)

After a lapse of 30 minutes since the lighting of a light source device in a darkroom at 23° C., Y values in a XYZ display system in the front direction were measured using a conoscope (manufactured by Autronic-Melchers) when a white image and a black image were displayed. Based on the Y value in the white image display (YW: white luminance) and the Y value in the black image display (YB: black luminance), a contrast ratio "YW/YB" was calculated.

(Contrast Ratio in Oblique Direction of Liquid Crystal Display)

Figure 5:
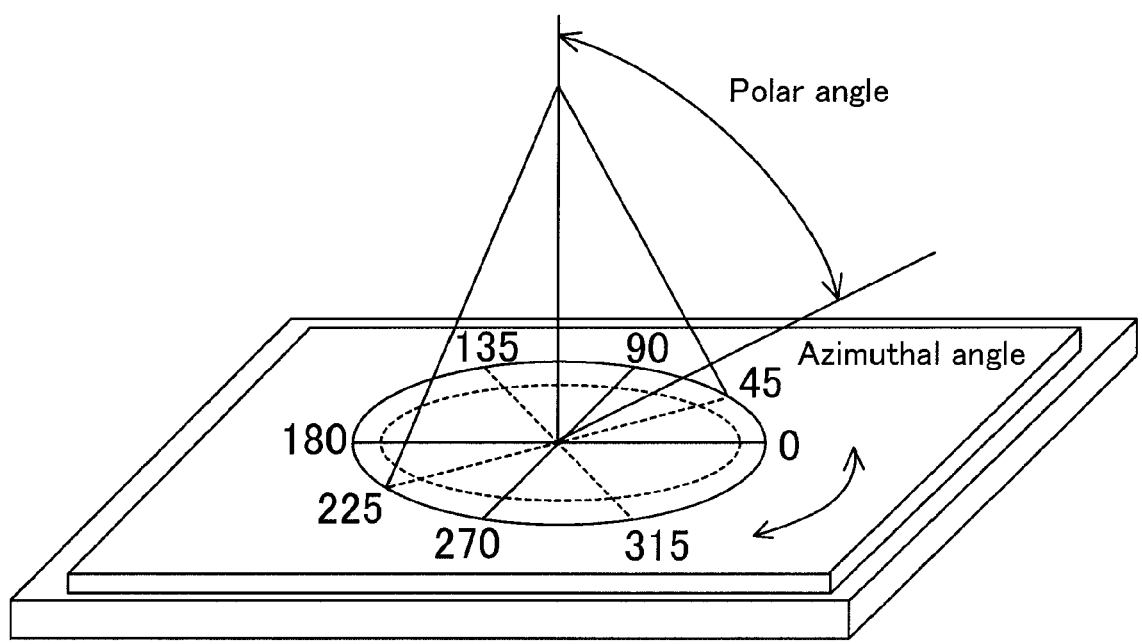
FIG. 5 is a schematic view showing a relationship between a polar angle and an azimuthal angle.

After a lapse of 30 minutes since the lighting of a light source device in a darkroom at 23° C., Y values in a XYZ display system was measured using a conoscope (manufactured by Autronic-Melchers) when a white image and a black image were displayed, while changing an azimuthal angle from 0° to 360° in the direction of a polar angle of 60° to measure Y values at azimuthal angles of 45°, 135°, 225°, and 315°. Based on the Y value in the white image display (YW: white luminance) and the Y value in the black image display (YB: black luminance), a contrast ratio "YW/YB" in the oblique direction was calculated, and average values of the contrast ratio in the oblique direction at the azimuthal angles of 45°, 135°, 225°, and 315° were determined. The azimuthal angles and the polar angle are as shown in FIG. 5, and 0° of the azimuthal angle points in the 3 o'clock direction.

(Half-Value Angle of Parallel Light Beam Emitted from Light Source Device)

A luminance of light emitted from a light source device in every direction (polar angle from 0° to 80°) was measured using a conoscope (manufactured by Autronic-Melchers). From this measurement result, the sum of two angles (two points in the left and right direction or the up and down direction of a liquid crystal display) at each of which a luminance is ½ the maximum luminance was set to the half-value angle of a parallel light beam emitted from the light source device.

(Shielding Angle of Selective Light-Shielding Layer)

A selective light-shielding layer was arranged on the upper side of a diffusion light source with a half-value angle of about 100°. Then, a luminance of transmitted light on the upper surface of the selective light-shielding layer in every direction (polar angle from 0° to 80°) was measured using a conoscope (manufactured by Autronic-Melchers) (L1). Thereafter, a luminance of only the diffusion light source was measured (L2). A transmittance (L1/L2) was calculated from both of the measurement results of the luminances, and a sum of two angles (polar angles) (two points in the direction orthogonal to the longitudinal direction of dark layers (light-shielding parts)), at each of which the transmittance shows ½ the maximum transmittance, was set to a light-shielding angle. In the example described below, a light-shielding angle in the direction orthogonal to the longitudinal direction of the dark layers (light-shielding parts) shows the minimum light-shielding angle in every direction.

(Diffusion Half-Value Angle of Light Diffusion Layer)

A light diffusion layer was irradiated with green laser light, and then, a luminance of generated diffusion light in every direction (polar angle from 0° to 80°) was measured using a conoscopse (produced by Autronic-Melchers). From this measurement result, the sum of two angles (two points in the left and right direction or the up and down direction of a liquid crystal display) at each of which a luminance is ½ a front diffusion luminance was set to a diffusion half-value angle of the light diffusion layer.

Example 1

Production of Light Source Device that Emits Parallel Light Beam

A light source device having a configuration shown in FIG. 2A was produced. In the light source device of this example, a light source of 100 W metal halide lamp was used as a light source 34. A spot slit having a slit width φ of 20 mm was used as a spot slit 36. An aluminum mirror surface reflection plate having a reflectance of 90% was used as an aluminum mirror surface reflection plate 37. An acrylic Fresnel lens in size of 20-inch diagonal and a focal distance f of 40 cm was used as a Fresnel lens 32. "Holographic Diffusers LSD5PE5-10" (product name), manufactured by Physical Optics Corporation was used as a diffusion sheet 33. A half-value angle of a parallel light beam emitted from this light source device was 13°.

[Provision of Liquid Crystal Cell]

A liquid crystal panel was taken out from a commercially available liquid crystal display ("BRAVIA KDL20J" (product name), manufactured by Sony Corp.) including a VA mode liquid crystal cell, and optical films, such as polarizing plates, arranged on the upper and lower sides of the liquid crystal cell were all removed. Then, both sides of a glass plate of this liquid crystal cell were washed. Thus, a liquid crystal cell was provided.

[Production of Display Surface-Side Composite Polarizing Plate]

(1) Provision of Display Surface-Side Polarizing Plate

A polarizing plate ("SEG1423DU" (product name), manufactured by Nitto Denko Corporation) was provided. This polarizing plate includes a mould releasing film, a pressure-sensitive adhesive layer, a back surface protective film, a polarizer, a front surface protective film, and a surface protective layer, laminated in this order. The polarizer corresponds to a display surface-side polarizer of the present invention.

(2) Production of Selective Light-Shielding Layer

Figure 6A:
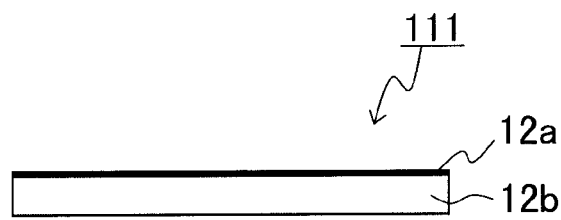
FIGS. 6A to 6D are diagrams explaining the course of producing a selective light-shielding layer of the example.
Figure 6B:
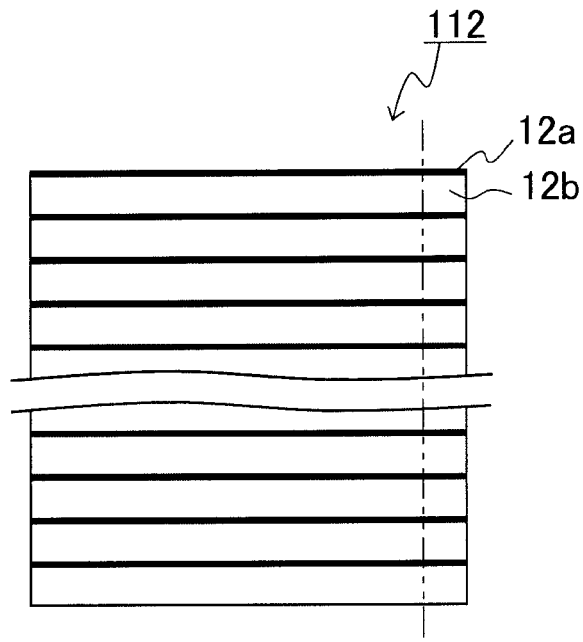
Figure 6C:
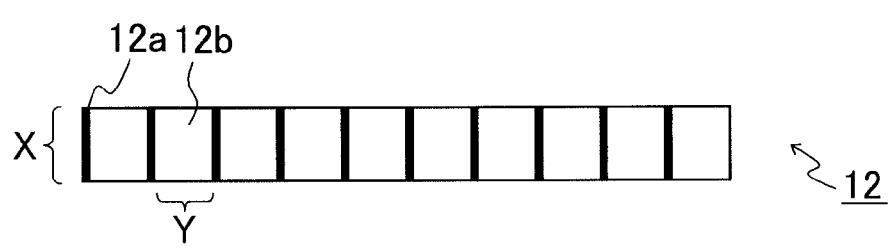
Figure 6D:
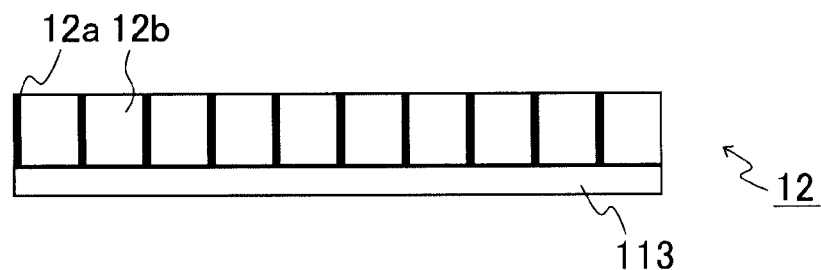

The course of producing a selective light-shielding layer is explained with reference to FIGS. 6A to 6D. 5 parts by weight of carbon black ("SPECIAL BLACK 250" (product name), manufactured by Degussa) was added to 95 parts by weight of cellulose acetate butyrate (CAB, manufactured by Eastman Chemical Company), which was then kneaded at 220° C. Thus, a resin composition was obtained. Thereafter, this resin composition and CAB were coextruded at 220° C. Thus, a two-layer laminate sheet 111 (with a total thickness of 0.132 mm, the thickness of the dark layer (light-shielding part)/the thickness of transparent layer (light-transmitting part)=1/10) in which a dark layer (light-shielding part) 12a containing the resin composition and a transparent layer (light-transmitting part) 12b containing the CAB were laminated to each other was produced (FIG. 6A). Then, this two-layer laminate sheet 111 was cut into stripes, and about 5000 pieces of the two-layer laminate sheet 111 were laminated in the direction perpendicular to the longitudinal direction of the pieces. Thereafter, this laminate thus obtained was heated at 160° C. while pressuring (200 N/m²) from the side surfaces and upper part thereof so that the pieces of the two-layer laminate sheet 111 were welded to one another. Thus, a welded laminate 112 was produced (FIG. 6B). Then this welded laminate 112 was sliced (along the dashed double dotted line in FIG. 6B) so that the cross-sectional width becomes 0.25 mm. Thus, a selective light-shielding layer 12 was produced (FIG. 6C). In this selective light-shielding layer 12, the thickness (X) of each of dark layers (light-shielding parts) 12a was 2.08 times the width (Y) of each of transparent layers (light-transmitting parts) 12b. The light-shielding angle of this selective light-shielding layer 12 was 25°. This angle was 1.9 times a half-value angle of a parallel light beam emitted from the light source device. An acrylic pressure-sensitive adhesive layer 113 (with the thickness of 23 μm) was additionally attached to one surface of this selective light-shielding layer 12 (FIG. 6D).

(3) Production of Light Diffusion Layer 35 parts by weight of silicone fine particles ("TOSPEARL 120" (product name), manufactured by Momentive Performance Materials Japan LLC) was added to 100 parts by weight of a hard coat monomer solution ("PC1070" (product name), manufactured by DIC Corporation), which was then mixed by stirring them for 1 hour. A resultant mixture was subjected to degassing and then applied on one surface of a triacetylcellulose (TAC) film ("TD80UZ" (product name), manufactured by FUJIFILM Corporation). An applied film thus obtained was dried for 2 minutes at 100° C. Thereafter, it was irradiated with ultraviolet light at an accumulated light intensity at 365 nm of 300 mJ/cm$^2$ using a high pressure mercury lamp. Thus, a light diffusion hard-coated TAC film with an applying thickness of 45 μm was produced. The surface of a light diffusion layer was flat, and a surface roughness Ra of the same was 0.01 μm. The surface roughness Ra was measured as follows. A glass plate (with a thickness of 1.3 mm) manufactured by Matsunami Glass Ind., Ltd. was attached to the surface of the light diffusion hard-coated TAC film on which no light diffusion layer had been formed, with a pressure-sensitive adhesive. Subsequently, the surface shape of the light diffusion layer was measured using a high-precision microfigure measuring instrument (SURF-CORDER ET4000 (product name), manufactured by Kosaka Laboratory Ltd.) and the arithmetic average surface roughness Ra was then determined. The high-precision microfigure measuring instrument automatically calculates the arithmetic average surface roughness Ra. The arithmetic average surface roughness Ra is based on JIS B 0601 (1994 version). A diffusion half-value angle of this light diffusion hard-coated TAC film was 60°. An acrylic pressure-sensitive adhesive layer (with the thickness of 23 μm) was additionally attached to this light diffusion hard-coated TAC film.

(4) Production of Composite Polarizing Plate

The selective light-shielding layer was attached to a surface on the surface protective layer side of the display surface-side polarizing plate via the pressure-sensitive adhesive layer of the selective light-shielding layer so that the absorption axis of the polarizer becomes parallel to the longitudinal direction of the dark layers (light-shielding parts) of the selective light-shielding layer. Then the light diffusion layer was attached to a surface on the side opposite to the polarizer side of the selective light-shielding layer via the pressure-sensitive adhesive layer of the light diffusion layer. Thus, a composite polarizing plate into which the light diffusion layer had been integrated, being used in the example, was produced.

[Provision of Back Surface-Side Polarizing Plate]

The same polarizing plate as the display surface-side polarizing plate except for removing the surface protective layer was provided.

[Provision of Retardation Plate]

A biaxial retardation plate ("NZB 55-240" (product name), manufactured by Nitto Denko Corporation) was provided. This was used as a retardation plate.

[Production of Liquid Crystal Display]

The display surface-side composite polarizing plate was attached to the display surface side of the liquid crystal cell via the pressure-sensitive adhesive layer of the composite polarizing plate so that the absorption axis of the display surface-side polarizer becomes parallel to the long-side direction of the liquid crystal cell. Then, the retardation plate was attached to the back surface side of the liquid crystal cell via an acrylic pressure-sensitive adhesive (with the thickness of 20 μm) so that the slow axis direction of the retardation plate becomes parallel to the long-side direction of the liquid crystal cell. Thereafter, the back surface-side polarizing plate was attached to a surface opposite to the liquid crystal cell side of the retardation plate via a pressure-sensitive adhesive layer of the back surface-side polarizing plate so that the absorption axis direction of the back surface-side polarizer becomes orthogonal to the long-side direction of the liquid crystal cell. At that time, the absorption axis of the display surface-side polarizer was orthogonal to the absorption axis of the back surface-side polarizer. The light source device was arranged on the back surface side of the liquid crystal display panel thus obtained. Thus, a liquid crystal display of the present example was produced. The properties of the liquid crystal display of the present example are shown in Table 1 below.

Comparative Example 1

Production of Composite Polarizing Plate

A light diffusion layer was attached to a surface on a surface protective layer side of a display surface-side polarizing plate via a pressure-sensitive adhesive layer of the light diffusion layer, without an intervention of the selective light-shielding layer. Thus, a composite polarizing plate of the present comparative example was produced.

[Production of Liquid Crystal Display]

A liquid crystal display of the present comparative example was produced in the same manner as in Example 1 except that the composite polarizing plate was attached on the display surface side of the liquid crystal cell via a pressure-sensitive adhesive layer of the composite polarizing plate so that the absorption axis direction of the display surface-side polarizer becomes parallel to the long-side direction of the liquid crystal cell. The properties of the liquid crystal display of the present comparative example are shown in Table 1 below.

Comparative Example 2

Production of Liquid Crystal Display

A liquid crystal display of the present comparative example was produced in the same manner as in Comparative Example 1 except that a selective light-shielding layer was attached to a surface opposite to the liquid crystal cell side of a back surface-side polarizing plate via a pressure-sensitive adhesive layer of the selective light-shielding layer so that the absorption axis of the back surface-side polarizer becomes orthogonal to the longitudinal direction of dark layers (light-shielding parts) of the selective light-shielding layer. Properties of the liquid crystal display of the present comparative example are shown in Table 1 below.

TABLE 1

|  | Example 1 | Comp. Ex. 1 | Comp. Ex. 2 |
| --- | --- | --- | --- |
| White luminance in front direction | 300 | 430 | 290 |
| Black luminance in front direction | 0.14 | 0.39 | 0.25 |
| Contrast ratio in front direction | 2143 | 1103 | 1160 |
| White luminance in oblique direction | 60 | 75 | 55 |
| Black luminance in oblique direction | 0.029 | 0.300 | 0.149 |
| Contrast ration in oblique direction | 2068 | 250 | 369 |

As shown in Table 1, in the liquid crystal display of Example 1, in which the selective light-shielding layer was arranged between the display surface-side polarizer and the light diffusion layer, black luminances in the front direction and an oblique direction were suppressed to be low, and the contrast ratios in the front direction and the oblique direction were high. In contrast, in the liquid crystal display of Comparative Example 1, using no selective light-shielding layer, and the liquid crystal display of Comparative Example 2, in which the selective light-shielding layer was arranged between the back surface-side polarizer and the light source device, black luminances in the front direction and an oblique direction were high, and the contrast ratios in the front direction and the oblique direction were low.

INDUSTRIAL APPLICABILITY

As described above, the liquid crystal display of the present invention can improve the contrast ratio in the front direction thereof. Examples of the use thereof include: office automation equipment such as desktop personal computers, notebook computers, and copy machines; portable devices such as mobile phones, watches, digital cameras, personal digital assistants (PDAs), and portable game devices; household electric appliances such as video cameras, televisions, and microwave ovens; vehicle-mounted devices such as back monitors, car navigation system monitors, and car audios; exhibition devices such as information monitors for commercial stores; security devices such as surveillance monitors; and nursing care and medical devices such as nursing-care monitors and medical monitors. There is no limitation of the use thereof and the liquid crystal display is applicable to a wide range of fields.

The invention claimed is:

1. A liquid crystal display comprising, in sequence:
   a light source device that emits a parallel light beam;
   a back surface-side polarizer;
   a liquid crystal cell;
   a display surface-side polarizer; and
   a light diffusion layer,
   wherein the liquid crystal display further comprises: a selective light-shielding layer between the display surface-side polarizer and the light diffusion layer so that the selective light-shielding layer shields light that is generated by being depolarized and scattered in the liquid crystal cell and travels in a direction that is different from a direction in which the parallel light beam travels,
   the light source has a half-value angle of the parallel light beam being 20° or less,
   an absorption axis of the back surface-side polarizer is orthogonal to that of the display surface-side polarizer,
   the selective light-shielding layer comprises light-shielding parts and light-transmitting parts, and the light-shielding parts and the light-transmitting parts are arranged in stripes so that a direction orthogonal to a width direction of the stripes becomes parallel to an absorption axis of the display surface-side polarizer, and
   the liquid crystal cell contains liquid crystal molecules aligned in a homeotropic alignment.

2. The liquid crystal display according to claim 1, wherein a light-shielding angle of the selective light-shielding layer is in a range from 0.7 to 3.0 times the half-value angle of the parallel light beam emitted from the light source device.

3. The liquid crystal display according to claim 1, wherein a light-shielding angle of the selective light-shielding layer is in a range from 1° to 100°.

4. The liquid crystal display according to claim 1, wherein a diffusion half-value angle of the light diffusion layer is in a range from 10° to 100°.

5. The liquid crystal display according to claim 1, wherein a surface roughness Ra of the light diffusion layer is 0.1 μm or less.

6. The liquid crystal display according to claim 1, wherein a thickness (X) of each of the light-shielding parts is greater than a width (Y) of each of the light-transmitting parts.

7. The liquid crystal display according to claim 6, wherein the thickness (X) of each of the light-shielding parts is 1.5 times or more the width (Y) of each of the light-transmitting parts.

* * * * *